US007195392B2

United States Patent
Shiau (10) Patent No.: US 7,195,392 B2
(45) Date of Patent: Mar. 27, 2007

(54) BACKLIGHT MODULE WITH AN IMPACT DAMPING DESIGN

(75) Inventor: Deng-Kuen Shiau, Gongliao Township, Taipei County (TW)

(73) Assignee: A U Optronics Corporation, Hsin-Chu (TW)

( * ) Notice: Subject to any disclaimer, the term of this patent is extended or adjusted under 35 U.S.C. 154(b) by 112 days.

(21) Appl. No.: 10/847,912

(22) Filed: May 19, 2004

(65) Prior Publication Data

US 2005/0169010 A1    Aug. 4, 2005

(30) Foreign Application Priority Data

Jan. 29, 2004    (TW)    .............................. 93102106 A (51) Int. Cl.
*F21S 4/00*    (2006.01)
(52) U.S. Cl. ....................... 362/633; 362/369; 362/561
(58) Field of Classification Search ................ 362/561, 362/632–634, 369; 349/58
See application file for complete search history.

(56) References Cited

U.S. PATENT DOCUMENTS

| 6,175,396 | B1* | 1/2001 | Kim et al. ..................... 349/58 |
| 6,512,557 | B1* | 1/2003 | Miwa ........................... 349/58 |
| 6,806,921 | B2* | 10/2004 | Nishida et al. ............... 349/58 |
| 2005/0157520 | A1* | 7/2005 | Chuang et al. ............. 362/632 |
| 2005/0243238 | A1* | 11/2005 | Cha et al. ..................... 349/58 |

* cited by examiner

*Primary Examiner*—Ali Alavi
(74) *Attorney, Agent, or Firm*—Bacon & Thomas, PLLC (57) ABSTRACT

This invention is related to a backlight module for a liquid crystal display device and, more particularly, to a backlight module having a frame with an impact damping design. The impact damping design can damp impact or absorb impact energy, and thereby protect the important components of the backlight module, such as the lamp or the light guide plate. The backlight module includes a light guide plate that has at least one protrusion located at its periphery, and a frame that has at least one indentation part located at its inner side edge. The indentation part engages with the protrusion to fix the light guide plate, and has at least one opening nearby to damp an impact to the indentation part.

20 Claims, 9 Drawing Sheets

BACKLIGHT MODULE WITH AN IMPACT DAMPING DESIGN

BACKGROUND OF THE INVENTION

1. Field of the Invention

The present invention relates to a backlight module for a liquid crystal display device and, more particularly, to a backlight module having a frame with an impact damping design used in a liquid crystal display device.

2. Description of Related Art

Figure 1:
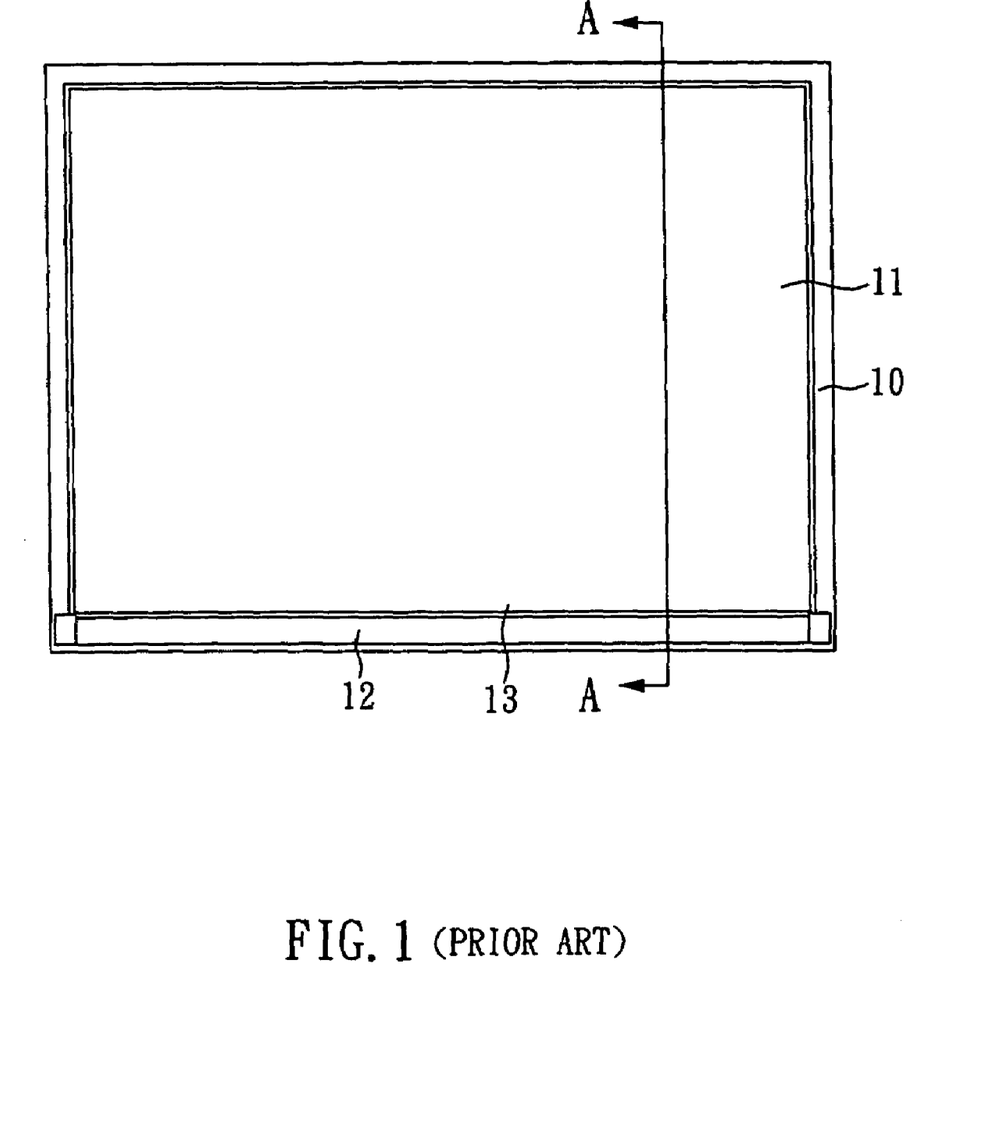
FIG. 1 is a cross-section view showing the backlight module of the prior art.
Figure 2:
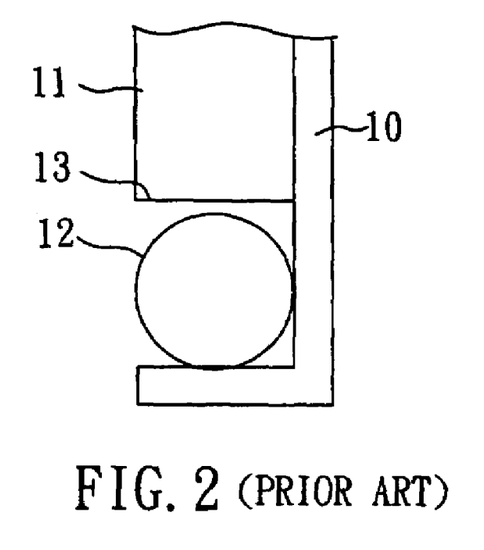
FIG. 2 is an enlarged cross-sectional view taken along the line A—A in FIG. 1.

With reference to FIGS. 1 and 2, FIG. 1 is a top view of the backlight module of a prior art, and FIG. 2 is an enlarged sectional view taken along the line A—A in FIG. 1. The liquid crystal display device commonly needs an additional backlight module acting as a light source. In practice, the backlight module uses a light guide plate 11 to transform the light rays provided by a lamp 12 into a uniform planar light source, and a frame 10 to accommodate and fix all the components of the backlight module.

When estimating the reliability of a backlight module, the Shock Test is one of the important tests. Two particular requirements to pass the Shock Test are that the structure of the backlight module cannot be deformed, and the components of the backlight module, such as the light guide plate 11 or the lamp 12 cannot be damaged, the lamp 12 especially. The type of the lamp 12 most used currently in the industry is the cold cathode fluorescent lamp (CCFL), which contains mercury vapor. If the cold cathode fluorescent lamp is damaged, then the user and the environment will be seriously contaminated. Therefore, under the demands of environmental protection and safety consideration, the conditions for carrying out the Shock Test have become more and more exhaustive. In particular, the light guide plate 11 often impacts the lamp 12 due to inertia when external shock energy is applied. Therefore, there must be a suitable design for fixing the light guide plate 11.

However, the design for fixing the light guide plate is confronted by strict challenges, which are illustrated as the following:

Firstly, as the information products have a tendency toward being lightweight and small in size, there is less and less space on the frame 10 for constructing a fixing structure. In addition to that, the frame 10 must reserve some space for disposing the cables of the driving ICs because more and more Driving ICs are needed. Consequently, the usable space of the frame 10 is even more reduced.

Secondly, the light guide plate 11 has to provide a uniform planar light source. The light-guiding efficiency of the light guide plate 11 and the progress paths of the light rays have been precisely simulated and experimented with. Accordingly, any irregular protrusion or indentation on the light guide plate will cause local light dispersion to be not uniform.

Thirdly, the light entry side 13 of the light guide plate 11 easily impacts on the lamp 12 when the Shock Test is carried out. Also, the light entry side 13 is a receiving side that receives the light rays coming from the lamp 12. Under the consideration of the displaying brightness, there cannot be any blocking structure located between the light guide plate 11 and the lamp 12 to prevent the light guide plate 11 from impacting on the lamp 12.

Figure 3:
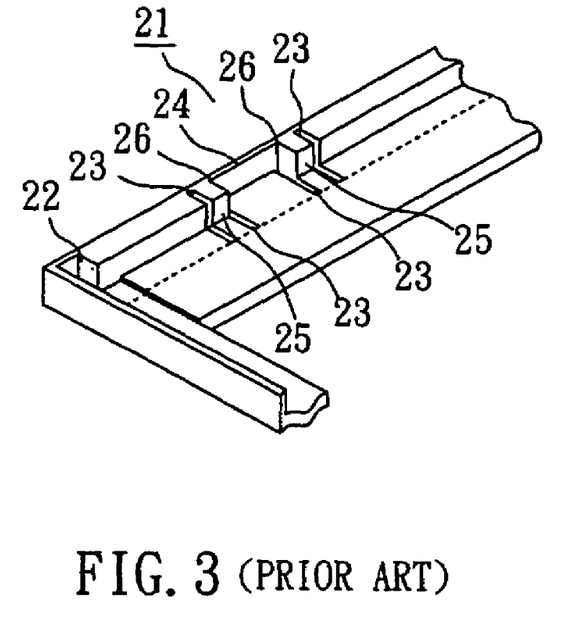
FIG. 3 is a perspective view showing the damping structure of the frame in one prior art.

Japanese Patent No. JA-2003-66420 disclosed a fixing design of a light guide plate, which is relevant to the above-mentioned problems. With reference to FIG. 3, there is a lamp housing 22 for locating a lamp (not shown in this figure), and a frame 21 with an indentation part 24. The light guide plate has a protrusion (not shown in this figure) that corresponds to the indentation part 24 so that the light guide plate can be fixed. Near the indentation part 24, there is a slit 23 for forming a damping structure 25. However, such a design will face the problems described below:

(I) Too much space is occupied: Said patent utilizes the slit to form a damping structure resembling a cantilever beam, which occupies too much space. Especially, as the information products tend to be light, thin, and small, and more and more driving ICs are required to get higher resolution, there must be space reserved on the frame for disposing the cables. Consequently, difficulties are experienced in applying that design. (II) The root of the cantilever beam is easily broken: Because the root 26 of the cantilever is frail, it will be broken easily when the condition of the Shock Test becomes particularly severe. (III) The test and verification of the fixing design are difficult: Because the result of the Shock Test is unpredictable, the fixing design has to undergo continuous modification and practical verification from design on paper to mass production. However, the mold for producing the frame structure disclosed by that patent is hard to be modified and thus a lot of verification time is needed. (IV) The structure of the mold is complex: No matter whether it is the verification process before making the mold, or the modification process after making the mold, both the structures concerned are complex and both the processes are time-consuming, and thus the exploitation progress is seriously delayed.

Figure 4:
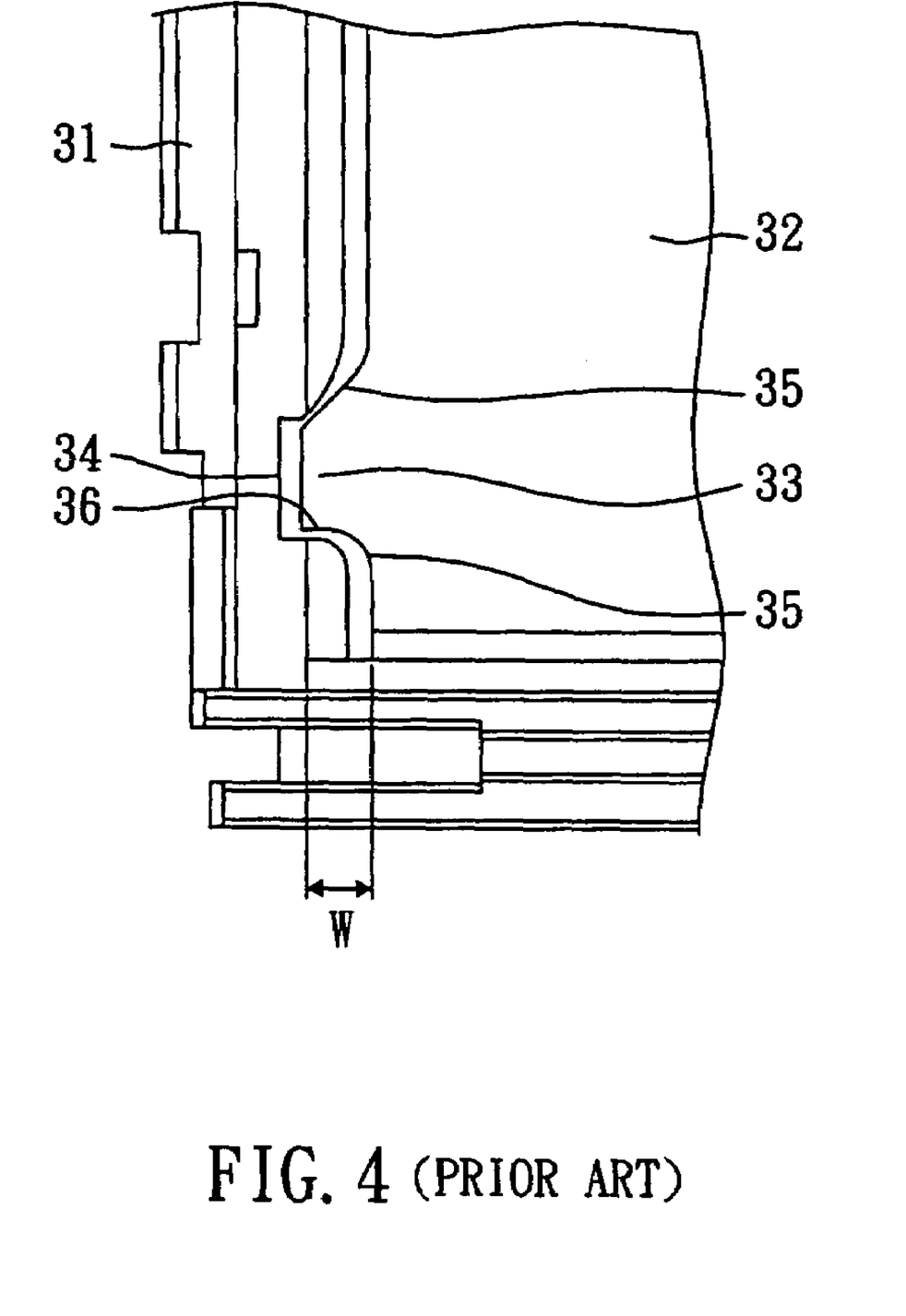
FIG. 4 is a top view showing the damping structure of the frame in another prior art.

TW Patent No. 525,791 disclosed another similar design for fixing the light guide plate of the backlight module. With reference to FIG. 4, there is an indentation part 34 formed on a frame 31, and a protrusion 33 located on a light guide plate 32. The protrusion 33 can engage with the indentation part 34 to fix the light guide plate 32. In order to pass the Shock Test and prevent the corner 35 of the protrusion 33 from cracking, the corner 35 is commonly designed as a circular angle that can avoid stress concentration. However, based on the consideration of usable space on the frame 31, the width W of the protrusion 33 is already very small (about 5 mm). If the corner is designed as a circular angle, the straight part 36 of the protrusion 33 will be even smaller. Combined with the manufacturing tolerance, the protrusion 33 of the light guide plate will easily come off the indentation part 34, and then the light guide plate will impact on the lamp. Hence, the shock durability of that design is still not high enough.

Therefore, it is desirable to provide a backlight module with an impact damping design to mitigate and/or obviate the aforementioned problems.

SUMMARY OF THE INVENTION

The object of the present invention is to provide a backlight module having high durability for successfully undergoing the Shock Test.

Another object of the present invention is to provide a backlight module that is easy to be verified.

To achieve the object, the backlight module with an impact damping design of the present invention includes a light guide plate that has at least one protrusion located at its periphery, and a frame that has at least one indentation part located at its inner side edge. The indentation part engages with the protrusion to fix the light guide plate, and has at least one opening nearby. The opening and its vicinity form a damping structure that can absorb the impact energy transferred from the protrusion during the Shock Test, and prevent the protrusion from breaking.

To achieve the object, another backlight module with an impact damping design of the present invention includes a light guide plate that has at least one indentation part located at its periphery, and a frame that has at least one protrusion located at its inner side edge. The protrusion engages with the indentation part to fix the light guide plate, and has at least one opening nearby. The opening and its vicinity form a damping structure.

Other objects, advantages, and novel features of the invention will become more apparent from the following detailed description when taken in conjunction with the accompanying drawings.

DETAILED DESCRIPTION OF THE PREFERRED EMBODIMENT

Figure 5:
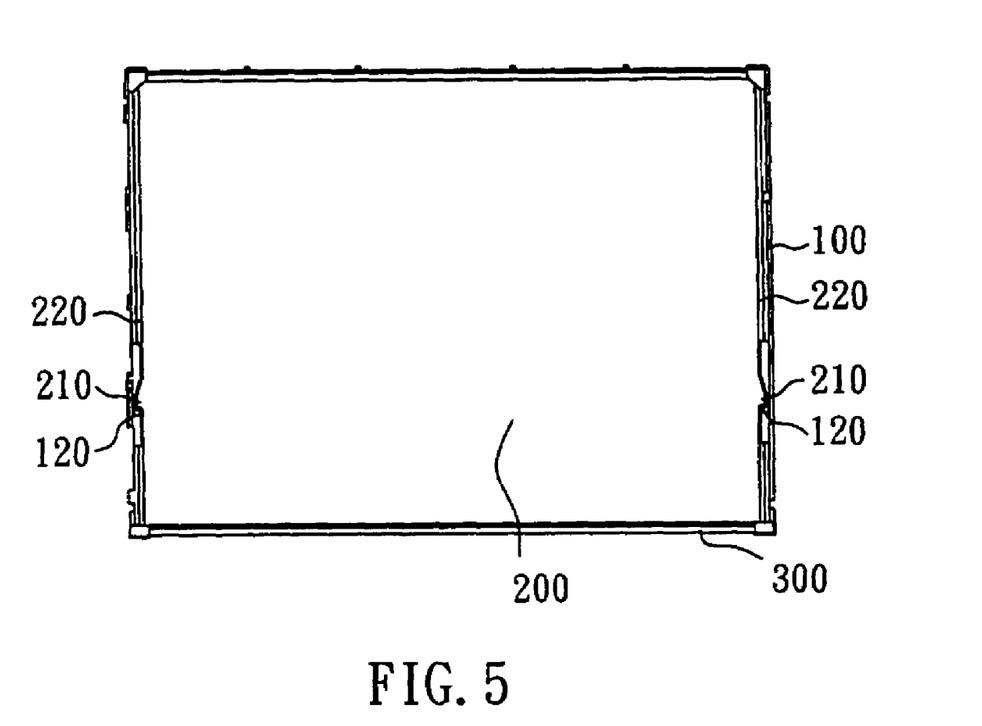
FIG. 5 is a cross-section view showing the backlight module of the present invention.
Figure 6:
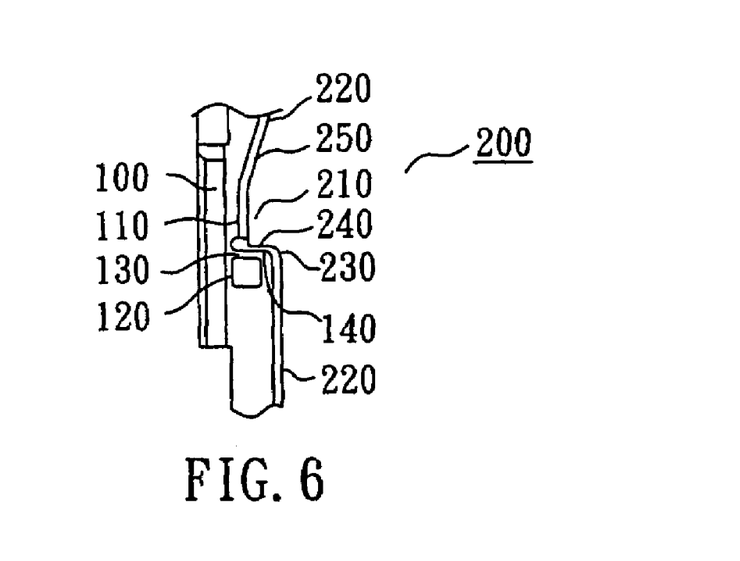
FIG. 6 is a top view showing the damping structure of one preferred embodiment of the present invention.

With reference to FIGS. 5 and 6, the backlight module has a frame 100, which accommodates a light guide plate 200 and a lamp 300. The light guide plate 200 has a pair of protrusions 210 located symmetrically at its periphery 220. The frame 100 has a pair of indentation parts 110 that correspond to the protrusions 210 of the light guide plate 200. By engaging the indentation parts 110 with the protrusions 210, the light guide plate 200 is fixed by the frame 100. The present invention is particularly characterized in that an opening 120 is formed near the indentation parts 110 on the frame 100 and, certainly, between the protrusion 210 and the lamp 300. The opening 120 can weaken the strength of its nearby structure on the frame 100 and form a damping part 130. When the protrusion 210 of the light guide plate 200 impacts on the indentation part 110 of the frame 100 due to an impact or a shock caused by the Shock Test or an accident that takes place on the backlight module, the energy of the impact or the shock can be effectively absorbed by the damping part 130. Therefore, the protrusion 210 is not easily broken, especially the corner 230. The equivalent in the prior art of the corner 230 used to be easily broken due to the concentrated stress. In order to moderate the concentration of stress, the corner 230 is therefore designed to be a circular angle. The larger the curvature of the circular angle is, the better the moderation of the concentration of stress will be. However, the aforesaid design has some limitations and derivative problems. As the curvature of the circular angle is increased, the straight part 240 of the protrusion 210, which is used to engage with the straight part 140 of the indentation part 110, will become shorter and shorter. In addition to that, the deviation caused by manufacturing tolerance should be considered at the same time. As a result, the light guide plate 200 will easily escape the constraint given by the frame 100, and then impact on the lamp. Nevertheless, the design of the present invention can reduce the curvature of the corner 230, and even permit the corner 230 to be a right angle. Hence, not only the reliability of the backlight module can be improved, but also the range of manufacturing tolerance that may affect production cost need not to be so tight. Furthermore, the top half edge 250 of the protrusion 210 can be a bevel edge when the backlight module only mounts a lamp below the light guide plate, because no concern need be given about impact on the top lamp and the bevel edge is sufficient for damping the impact and preventing the concentration of stress.

Figure 7:
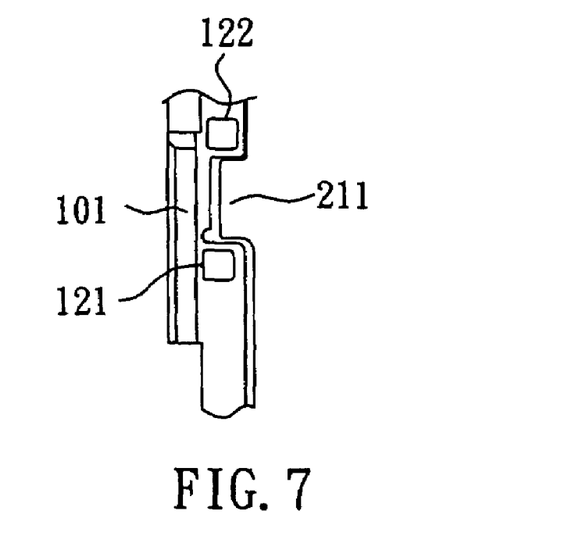
FIG. 7 is a top view showing the damping structure of another preferred embodiment of the present invention.

Anyone skilled in the art can easily infer that the shape of the opening 120 is not restricted to the rectangle drawn in FIG. 5. The opening 120 can be a circle or other polygons. The depth of the opening 120 is not limited, either. The opening 120 can be a through hole or a blind hole. Moreover, the location of the opening 120 is not restricted to be below the protrusion 210 and can also be above the protrusion 210. Alternatively, a pair of openings 121, 122 can be located respectively below the protrusion 211 and above the protrusion 211, as shown in FIG. 7. Similarly, the frame 101 can engage with the protrusion 211 for fixing the light guide plate. Next, with reference to FIG. 8, the light guide plate 400 of the backlight module has an indentation part 410 at its periphery, and a protrusion 510 that corresponds to the indentation part 410 is formed at the inner side edge of the frame 500. Through the engagement between the protrusion 510 and the indentation part 410, the light guide plate 400 is fixed by the frame 500. Furthermore, an opening 530 is located near the protrusion 510 to form a damping part 520 with a weakened structure. As in the principle described above, the damping part 520 similarly can absorb the impact energy and thus protect the lamp and the light guide plate 400.

Figure 9:
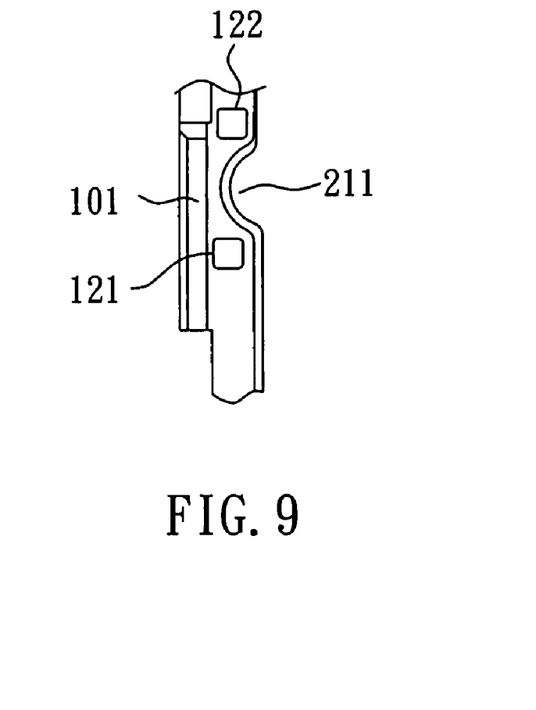
FIG. 9 is a top view showing the damping structure of another preferred embodiment of the present invention.

FIG. 9 is a top view showing the damping structure of another preferred embodiment of the present invention, which is similar to the damping structure shown in FIG. 7. In this damping structure, there are two openings 121, 122 located below and above the protrusion 211 of the light guide plate, respectively. Besides, the protrusion 211 of the light guide plate is circular, while the corresponding indentation part of the frame 101 is circular, too.

Figure 10:
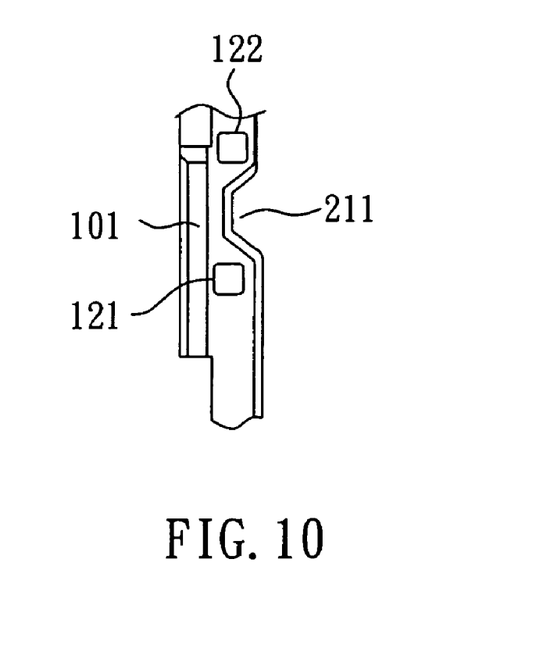
FIG. 10 is a top view showing the damping structure of another preferred embodiment of the present invention.

FIG. 10 is a top view showing the damping structure of another preferred embodiment of the present invention, which is similar to the damping structure shown in FIG. 7. In this damping structure, there are two openings 121, 122 located below and above the protrusion 211 of the light guide plate, respectively. Besides, the protrusion 211 of the light guide plate is trapezoid-shaped, while the corresponding indentation part of the frame 101 is trapezoid-shaped, too.

Figure 11:
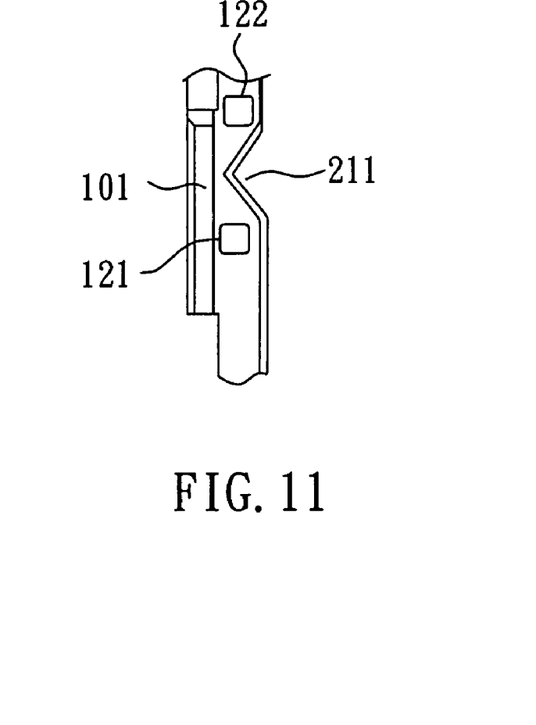
FIG. 11 is a top view showing the damping structure of another preferred embodiment of the present invention.

FIG. 11 is a top view showing the damping structure of another preferred embodiment of the present invention, which is similar to the damping structure shown in FIG. 7. In this damping structure, there are two openings 121, 122 located below and above the protrusion 211 of the light guide plate, respectively. Besides, the protrusion 211 of the light guide plate is triangular, while the corresponding indentation part of the frame 101 is triangular, too.

Figure 12:
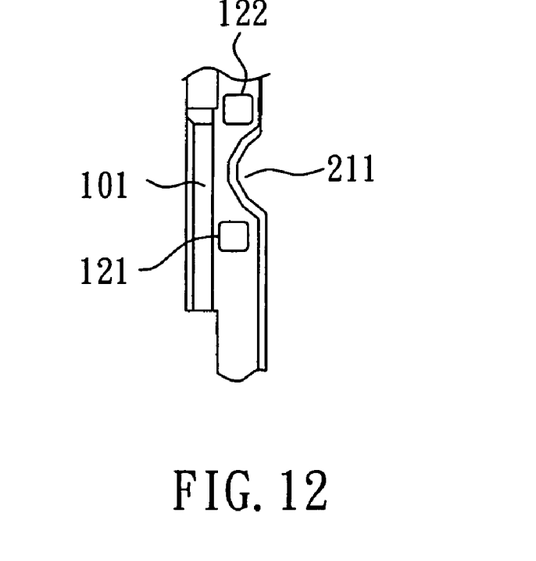
FIG. 12 is a top view showing the damping structure of another preferred embodiment of the present invention.

FIG. 12 is a top view showing the damping structure of another preferred embodiment of the present invention, which is similar to the damping structure shown in FIG. 7. In this damping structure, there are two openings 121, 122 located below and above the protrusion 211 of the light guide plate, respectively. Besides, the protrusion 211 of the light guide plate is polygonal, while the corresponding indentation part of the frame 101 is polygonal, too.

Figure 8:
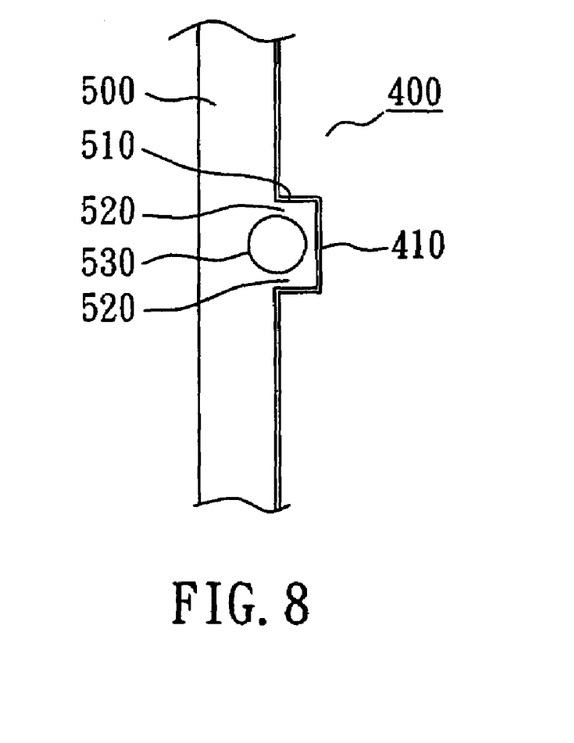
FIG. 8 is a top view showing the damping structure of another preferred embodiment of the present invention.
Figure 13:
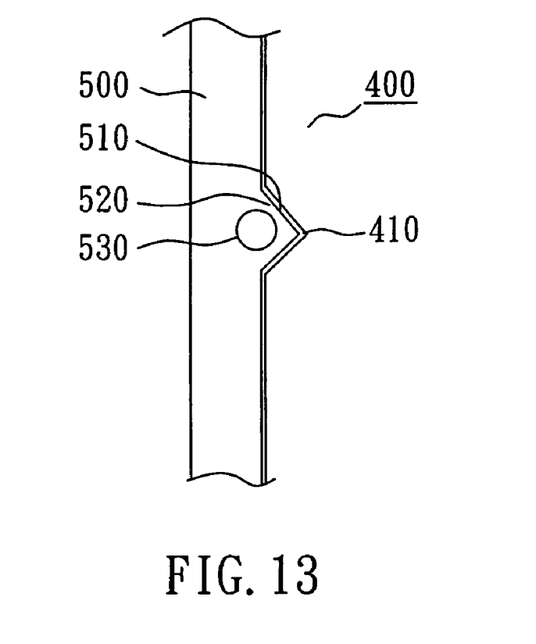
FIG. 13 is a top view showing the damping structure of another preferred embodiment of the present invention.

FIG. 13 is a top view showing the damping structure of another preferred embodiment of the present invention, which is similar to the damping structure shown in FIG. 8. In this damping structure, the light guide plate 400 of the backlight module has a triangular indentation part 410 at its periphery, and a triangular protrusion 510 that corresponds to the indentation part 410 is formed at the inner side edge of the frame 500. Through the engagement between the protrusion 510 and the indentation part 410, the light guide plate 400 is fixed by the frame 500. Furthermore, an opening 530 is located near the protrusion 510 to form a damping part 520 with a weakened structure. The damping part 520 absorbs the impact energy and thus protects the lamp and the light guide plate 400.

Figure 14:
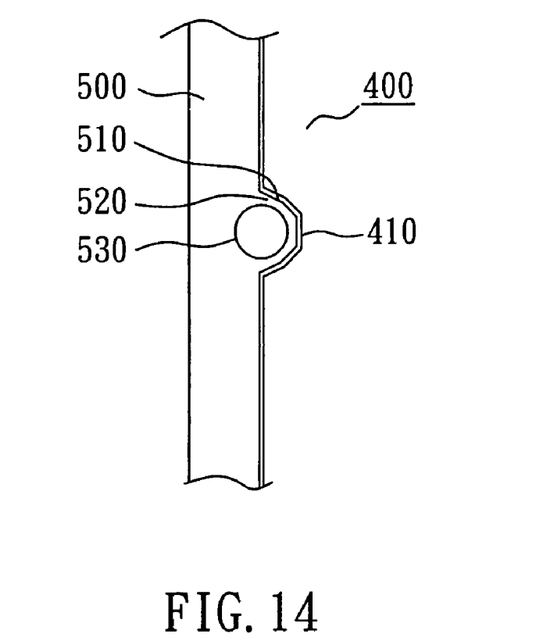
FIG. 14 is a top view showing the damping structure of another preferred embodiment of the present invention.

FIG. 14 is a top view showing the damping structure of another preferred embodiment of the present invention, which is similar to the damping structure shown in FIG. 8. In this damping structure, the light guide plate 400 of the backlight module has a polygonal indentation part 410 at its periphery, and a polygonal protrusion 510 that corresponds to the indentation part 410 is formed at the inner side edge of the frame 500. Through the engagement between the protrusion 510 and the indentation part 410, the light guide plate 400 is fixed by the frame 500. Furthermore, an opening 530 is located near the protrusion 510 to form a damping part 520 with a weakened structure. The damping part 520 absorbs the impact energy and thus protects the lamp and the light guide plate 400.

Figure 15:
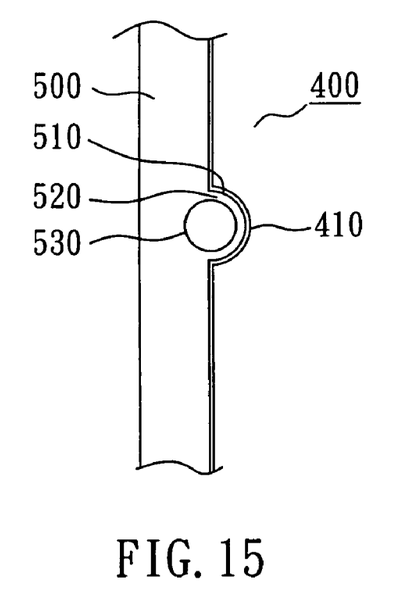
FIG. 15 is a top view showing the damping structure of another preferred embodiment of the present invention.

FIG. 15 is a top view showing the damping structure of another preferred embodiment of the present invention, which is similar to the damping structure shown in FIG. 8. In this damping structure, the light guide plate 400 of the backlight module has a circular indentation part 410 at its periphery, and a circular protrusion 510 that corresponds to the indentation part 410 is formed at the inner side edge of the frame 500. Through the engagement between the protrusion 510 and the indentation part 410, the light guide plate 400 is fixed by the frame 500. Furthermore, an opening 530 is located near the protrusion 510 to form a damping part 520 with a weakened structure. The damping part 520 absorbs the impact energy and thus protects the lamp and the light guide plate 400.

Figure 16:
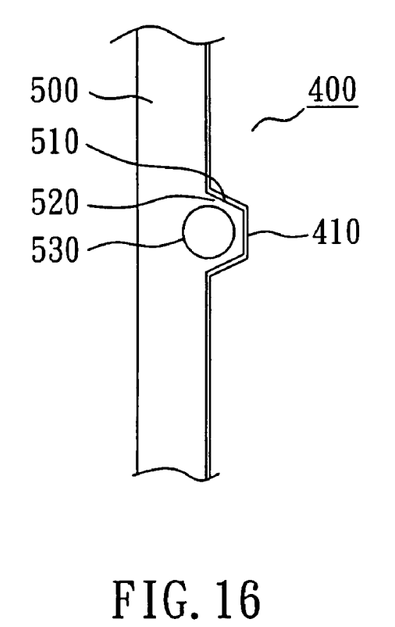
FIG. 16 is a top view showing the damping structure of another preferred embodiment of the present invention.

FIG. 16 is a top view showing the damping structure of another preferred embodiment of the present invention, which is similar to the damping structure shown in FIG. 8. In this damping structure, the light guide plate 400 of the backlight module has a trapezoid-shaped indentation part 410 at its periphery, and a trapezoid-shaped protrusion 510 that corresponds to the indentation part 410 is formed at the inner side edge of the frame 500. Through the engagement between the protrusion 510 and the indentation part 410, the light guide plate 400 is fixed by the frame 500. Furthermore, an opening 530 is located near the protrusion 510 to form a damping part 520 with a weakened structure. The damping part 520 absorbs the impact energy and thus protects the lamp and the light guide plate 400.

Through the comparison between the present invention and the prior arts, it can be summed up that the present invention has the following advantages:

1. The damping structure occupies little space of the frame, and hence the frame can offer a sufficient space for other use;

2. The damping structure is stable, so it does not fail through damage otherwise easily occurring. Therefore, it can absorb the impact energy effectively, and pass the strict Shock Test.

3. Owing to the impact energy absorbing capability of the damping structure, the curvature of the corner at the joint of the protrusion and the light guide plate can be reduced, and the corner can even be a straight angle. Hence, the range of the straight engagement is substantially enlarged. As a result, the light guide plate is successfully prevented from coming off the indentation part as well as preventing impact on the lamp.

4. The verification of the design effect is easier than that of the prior arts. Because the damping structure of the present invention is easily manufactured, its effect can be immediately verified by using a handmade sample. Therefore, the bottleneck that used to be encountered at the design process can be resolved right away.

5. The mold is easy to be modified. Because only an opening is needed, the process is simpler than the prior arts. Besides, the original whole structure of the mold is not affected, and the modification schedule can be controlled easily.

6. The present invention can be carried out easily. Because only the mold is modified and no additional handmade treatment is required, therefore, the present invention does not need more labor hours and is quite suitable for mass production. Thus, the cost of material and manpower will not be increased.

7. Not only the impact energy transferred in the vertical direction can be absorbed by the damping structure of the present invention, but also that in the horizontal direction can be absorbed. Consequently, the impact durability and reliability of the backlight module using the damping structure of the present invention is high.

Although the present invention has been explained in relation to its preferred embodiment, it is to be understood that many other possible modifications and variations can be made without departing from the spirit and scope of the invention as hereinafter claimed.

What is claimed is:

1. A backlight module for a liquid crystal display device comprising:
    a light guide plate having at least one protrusion located at its periphery; and
    a frame having at least one indentation part located at its inner side edge; wherein said indentation part engages with said protrusion for fixing said light guide plate, and has at least one closed opening located beside a border between said protrusion and said indentation part such that the edge of said indentation part serves as a cushion structure.

2. The backlight module as claimed in claim 1, wherein said protrusion is circular, rectangular, triangular, trapezoidal, or polygonal.

3. The backlight module as claimed in claim 1, wherein said indentation part is circular, rectangular, triangular, trapezoidal, or polygonal.

4. The backlight module as claimed in claim 1, wherein said opening is a through hole.

5. The backlight module as claimed in claim 1, wherein said opening is a blind hole.

6. The backlight module as claimed in claim 1, wherein said opening is circular, rectangular, triangular, trapezoidal, or polygonal.

7. The backlight module as claimed in claim 1, wherein said protrusion and the light guide plate form a circular angle at their joint.

8. The backlight module as claimed in claim 1, wherein said protrusion and the light guide plate form a right angle at their joint.

9. The backlight module as claimed in claim 1, wherein said protrusion has a bevel edge.

10. The backlight module as claimed in claim 1, wherein said indentation part has a bevel edge.

11. The backlight module as claimed in claim 1, wherein a pair of protrusions is located symmetrically at the periphery of said light guide plate.

12. The backlight module as claimed in claim 1, wherein a pair of indentation parts is located symmetrically at the inner side edge of said frame.

13. A backlight module for a liquid crystal display device comprising:
   a light guide plate having at least one indentation part located at its periphery; and
   a frame having at least one protrusion located at its inner side edge; wherein said protrusion engages with the indentation part for fixing said light guide plate and has at least one closed opening located beside a border between said protrusion and said indentation part such that the edge of said indentation part serves as a cushion structure.

14. The backlight module as claimed in claim 13, wherein said protrusion is circular, rectangular, triangular, trapezoidal, or polygonal.

15. The backlight module as claimed in claim 13, wherein said indentation part is circular, rectangular, triangular, trapezoidal, or polygonal.

16. The backlight module as claimed in claim 13, wherein said opening is a through hole.

17. The backlight module as claimed in claim 13, wherein said opening is a blind hole.

18. The backlight module as claimed in claim 13, wherein said opening is circular, rectangular, triangular, trapezoidal, or polygonal.

19. The backlight module as claimed in claim 13, wherein a pair of protrusions is located symmetrically at the inner side edge of said frame.

20. The backlight module as claimed in claim 13, wherein a pair of indentation parts is located symmetrically at the periphery of said light guide plate.

* * * * *